United States Patent Office 3,523,777
Patented Aug. 11, 1970

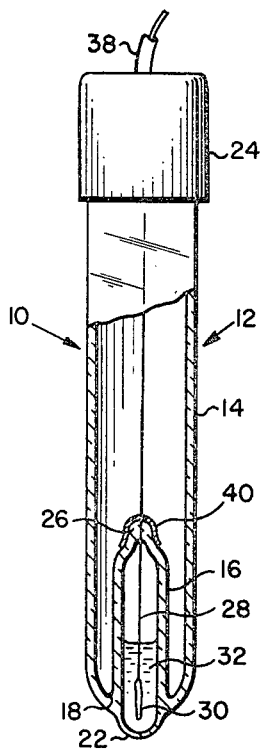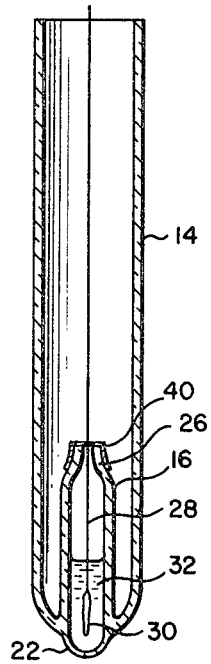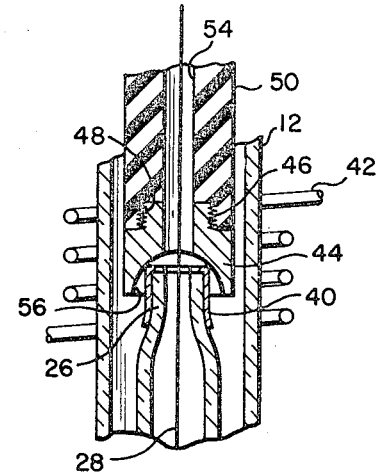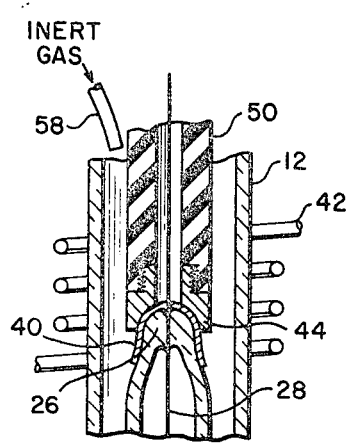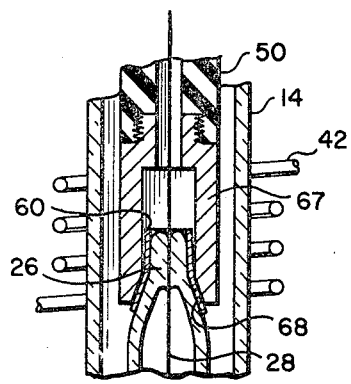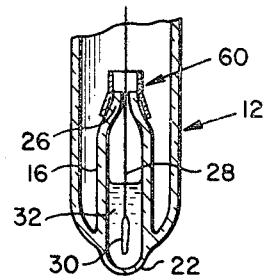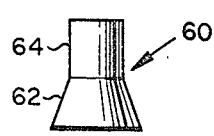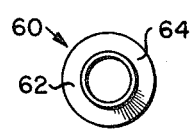

3,523,777
METHOD OF MAKING ELECTROCHEMICAL GLASS ELECTRODE ASSEMBLY
Arne J. Petersen, Balboa, John T. Taylor, Orange, and David Albert Rohrer, Whittier, Calif., assignors to Beckman Instruments, Inc., a corporation of California
Filed June 29, 1967, Ser. No. 649,962
Int. Cl. C03c 27/02
U.S. Cl. 65—40                                7 Claims

ABSTRACT OF THE DISCLOSURE

A method of making an electrochemical electrode, in which the internal half-cell is sealed into a constricted portion of an inner glass tube, by means of electromagnetic energy. The energy is conveyed to the constricted portion by a tool, inserted within the assembly, which contacts a separate thermally and electrically conductive layer which is provided between the tool and the constricted portion. Heat formed in the tool transfers from the tool through the conductive layer to the constricted portion. Thus, the layer is sealed to the constricted portion and the constricted portion is sealed to the wire which carries the half-cell.

---

This invention relates to a method of making an electrochemical electrode assembly and, more particularly, to a method of making glass electrodes utilized for ionic activity measurements of solutions.

Typical electrode assemblies for measuring the ionic activity of solutions are glass electrodes which comprise a tubular glass stem having a bulb of ion sensitive glass sealed thereto and an internal half-cell positioned in the stem. The half-cell is immersed in an electrolyte solution contacting the inner surface of the bulb.

It is desired in some instances to permanently seal the electrolyte in place in the glass electrode so that the electrode assembly may be used without the necessity of replenishing the electrolyte. A typical structure to accomplish this purpose is one in which the conductor for the internal half-cell is sealed in a glass tube which is mounted in the tubular stem of the glass electrode and sealed to the lower portion thereof adjacent to the ion sensitive bulb by cement or a suitable epoxy. The use of cement or other such sealing materials, however, makes the electrode unsuitable for use at elevated temperatures and pressures. A preferred means for sealing an internal half-cell into an electrode assembly formed of glass is the use of a glass ring seal. Such a seal is conventionally formed by the use of a torch flame. This method has the disadvantage, however, that the natural gas used to produce the flame poisons both the half-cell and the electrolyte of the electrode. As described in copending patent application of Petersen et al. entitled "Electrochemical Electrode Assembly and Method of Making Same," Ser. No. 518,247, filed Jan. 3, 1966, now abandoned, and assigned to the assignee of the present application, a glass ring seal may be made without the use of a flame by utilizing electromagnetic energy. More specifically, a conductive tool is positioned within the assembly with its end contacting a constricted portion of the glass assembly through which the conductor of the half-cell passes so that when electromagnetic energy is applied by means of an induction heater coil surrounding the assembly, heat is transferred from the tool to the glass causing it to soften or melt and, hence, seal to the conductor of the half-cell. While this method is entirely satisfactory for sealing the internal half-cell in the lower portion of a glass electrode assembly, it has the disadvantage that the tool employed for transferring heat to the glass assembly is subject to degradation due to oxidation after a relatively small number of assemblies are sealed. Also, sometimes when withdrawing the tool from the assembly the tool pulls off fibers of glass from the constricted portion of the assembly which is sealed to the internal half-cell thereby damaging the seal or rendering the tool useless. What is needed then is a method for sealing the half-cell in the constricted portion of the glass electrode assembly wherein the tool is not rendered inoperable by degradation and, therefore, may be used on a mass production basis and also without forming fibers of glass at and from the sealing area when the tool is withdrawn from the assembly.

It is, therefore, the principal object of the present invention to provide an improved method for sealing a metal wire in an electrode assembly made of glass.

According to the principal aspect of the present invention, a metal wire is sealed into a constricted portion of an electrode assembly formed of glass by applying a thin layer of electrically and thermally conductive material to the constricted portion prior to forming the seal. The tool which transfers electromagnetic energy from an induction coil to the area being sealed is applied directly to the conductive layer so that when electromagnetic energy is applied to the tool the heat thus formed transfers rapidly from the tool through the conductive layer to the constricted portion of the glass assembly causing the glass to seal to the wire. Since the tool does not directly contact the glass, when the tool is withdrawn from the assembly after forming the seal, no glass sticks or remains on the tool to limit its life nor are fibers of glass drawn from the sealing area as in the previously described method.

Other objects, aspects and advantages will become apparent from the following description taken in connection with the accompanying drawings wherein:

FIG. 1 is an elevation, partially in section, of an electrode assembly made in accordance with the present invention;

FIG. 2 is an elevation, in section, showing the internal half-cell positioned in the stem of the electrode illustrated in FIG. 1;

FIG. 3 is a fragmentary partial sectional view, somewhat enlarged, of the intermediate portion of the assembly shown in FIG. 2 and illustrating the position of the tool prior to forming the seal of the constricted portion of the glass electrode assembly to the conductor of the internal half-cell;

FIG. 4 is similar to FIG. 3 showing the assembly after the seal has been formed;

FIG. 5 is an elevation of the metallic element employed in the preferred embodiment of the method of the invention;

FIG. 6 is a top view of the element illustrated in FIG. 5;

FIG. 7 is an elevation, in section, of the lower portion of an electrode assembly with the element illustrated in FIGS. 5 and 6 shown assembled therein;

FIG. 8 is a fragmentary partial sectional view, somewhat enlarged, of the intermediate portion of the assembly shown in FIG. 7 and illustrating the assembly and sealing tool after the seal has been formed.

Referring now to the drawings in detail, wherein like reference characters designate like or corresponding parts throughout the various views, there is shown in FIG. 1 one embodiment of the invention in which the electrochemical electrode assembly is a glass electrode, referred to generally by numeral 10. The electrode has a stem 12 formed of two parts, an outer glass tube 14 and an inner glass tube 16 sealed to the outer tube by a glass ring seal 18. The glass of the tubes 14 and 16 is preferably Corning 0010 lead glass. An ion sensitive bulb 22 is sealed to the glass ring seal 18 at the end of the stem 12. A cap 24 closes the other end of the stem 12.

As seen in FIG. 1, the inner glass tube 16 has a constricted portion 26 which is closed and sealed to a wire 28 terminating in an internal half-cell 30. The bulb 22 and the lower portion of the stem 12 are filled with a suitable electrolyte 32 in which the half-cell is immersed. The upper end of the wire 28 is attached to a conductor (not shown) of a cable 38 which extends through the cap 24 for connection to a conventional high impedance amplifier such as a pH meter (not shown). Thus, by the construction shown in FIG. 1, the electrolyte 32 is sealed in the lower portion of the glass electrode and, therefore, does not require replenishing, and the conductor 28 for the internal half-cell 30 is sealed by glass to the stem 12 via the tube 16 to provide a rugged structure which is suitable for use at high temperatures and pressures.

In order to construct the assembly illustrated in FIG. 1, the stem 12 illustrated in FIG. 2 is first formed. The lower portion of the tube 16 is partially filled with electrolyte by inserting the needle of a syringe (not shown), carrying electrolyte through the constricted portion 26 of the tube 16. After the electrolyte is supplied to the lower portion of tube 16, the wire 28 is passed through the constricted portion 26 with the half-cell 30 at its end immersed in the electrolyte. Preferably the wire 28 is formed of platinum while the half-cell 30 typically consists of coatings of silver and silver chloride on the end of the wire.

In accordance with the present invention, a layer 40 of material which is thermally and electrically conductive is applied to the constricted portion 26 of the tube 16 prior to inserting electrolyte and wire 28 into the tube. Examples of suitable materials for the layer 40 are carbon emulsion or silver paint which may be applied to the constricted portion 26 by means of a brush.

The next step is to seal the constricted glass portion 26 to the platinum wire 28. This is accomplished by utilizing electromagnetic energy and directing the energy specifically to the point where the fusion is desired. As best seen in FIG. 3, the sealing is accomplished by use of an induction heater which includes an induction coil 42 having its ends connected to a suitable power source, not shown. In order to direct the electromagnetic energy of the heater to the point within the stem assembly 12 where the seal is desired to take place, a thermally and electrically conductive tool in the form of a sleeve 44 is positioned on top of the conductive layer 40 covering the constricted portion 26 of the tube 16. The tool 44 may be formed of graphite, carbon or a metal such as iron or iron alloy. The tool or sleeve 44 has a threaded section 46 received in a threaded opening 48 in the end of an elongated handle 50 preferably formed of nonconductive material such as a ceramic. The handle has a central passage 54 through which the wire 28 may pass. The handle 50 is inserted through the upper end of the stem 12 until the concave semi-hemispherical surface 56 at the end of the tool 44 contacts the coated constricted portion 26 of the tube 16. Electromagnetic energy generated by the induction heater 42 heats the tool 44. The heat from the tool 44 is transferred through the layer 40 to the constricted portion 26 until the constricted portion softens and seals to the platinum wire 28 as best seen in FIG. 4. During this sealing operation, the heat applied to the layer 40 causes the constricted portion 26 to conform to the cavity formed in the end of the tool 44. When the tool 44 is formed of graphite or carbon, to prevent oxidation of the tool during the sealing operation, an inert gas such as nitrogen or argon is passed through the assembly by means of a nozzle 58, as seen in FIG. 4, so that all oxidation supporting atmosphere is removed from the assembly. If, however, the metal tool is used instead of the graphite or carbon tool, no inert gas is needed. After the seal is formed, the tool 44 is removed without any glass remaining on its surface, thereby greatly extending the usefulness of the tool and eliminating the glass fibers which are sometimes formed when the tool directly contacts the glass constriction 26. The layer 40 seals to the constriction 26 in the sealing process and, therefore, remains as an integral part of the electrode assembly.

It can be appreciated that, by the method of the present invention, a complete seal is formed between the constricted portion 26 of the glass assembly and the platinum wire 28 without any appreciable degradation of the tool 44. Therefore, this method may be utilized for forming glass-to-metal seals in electrode assemblies made of glass on a mass production basis without requiring frequent replacement of the tool.

In accordance with the preferred embodiment of the present invention, there is employed as the intermediate conductive layer between the tool and the glass constriction 26 a metallic element 60 best seen in FIGS. 5 and 6. The element 60 is formed of a highly conductive metal such as copper, platinum or other metal which readily seals to glass. The preferred materials are Sylvania No. 4, a glass sealing metal product of Sylvania Corporation, or Sealmet, an iron-nickel-chromium alloy product of Sylvania. The element comprises a conical skirt portion 62 with a cylindrical neck portion 64 formed of a metal preferably having a thickness of about .001 to .005 inch. The element 60 is positioned over the constricted portion 26 of the electrode assembly at the time of filling the tube 16 with electrolyte and inserting the half-cell 30 therein as best seen in FIG. 7.

In order to seal the constriction 26 to the platinum wire 28, as best seen in FIG. 8, a tool 67 similar to tool 44 is positioned in the stem 14. The tool may be formed of the same materials as tool 44, but preferably is formed of a metal for the reasons which will appear later. The tool 67 has a conical surface 68 at its lower end which generally conforms to the shape of the conical skirt 62 of the element 60. Sufficient energy is applied via the induction heater 42 to the tool 67 to effect a seal of the constriction 26 to the patinum wire 30. At the same time, the element 60 seals or sticks to the outer surface of the constriction 26 so that when the tool 67 is removed from the assembly the element 60 remains as an integral part of the electrode assembly in the same manner as layer 40 in FIGS. 2–4.

The use of a tool formed of metal has the advantage over a graphite or carbon tool, in addition to being unaffected by oxidation, in that the metal tool together with the metal element 60 transfers heat more efficiently thereby permitting the sealing operation to be accomplished more rapidly.

It is understood that while electromagnetic energy is the preferred form of energy for forming the seal in accordance with the method of the present invention, other wave energy forms could possibly be used such as laser energy.

While the method of the present invention has been described in connection with forming a glass-to-metal seal in an electrochemical electrode assembly such as a glass electrode, it should be understood that the method could be employed for forming glass-to-metal seals in other types of assemblies wherein it is desired not to use a flame to effect the seal. For example, the method could be utilized to seal a platinum wire in a glass tube to form an electrode suitable for measuring oxidation and reduction potentials.

Although several embodiments of the invention have been disclosed herein for purposes of illustration, it will be understood that various changes can be made in the form, details, arrangement and proportions of the various parts in such embodiments without departing from the spirit and scope of the invention as defined by the appended claims.

What is claimed is:

1. A method of producing an electrochemical electrode assembly comprising the steps of:

providing a wire having an internal half-cell at one end thereof;

providing an assembly having inner and outer glass tubes with a glass ring seal sealing said tubes to each other adjacent to one end thereof, and said inner tube having a constricted portion intermediate the ends of said outer tube;

forming a bulb of ion sensitive glass at one end of said tubes;

applying a layer of electrically and thermally conductive material to said constricted portion;

substantially filling said bulb with electrolyte;

positioning said wire through said constricted portion of said inner tube with said half-cell immersed in said electrolyte;

contacting said layer with an electrically and thermally conductive tool; and applying sufficient wave energy to said tool to seal said layer to said constricted portion and said constricted portion to said wire yet not destroy said layer.

2. A method as set forth in claim 1 wherein said layer is applied to said constricted portion by positioning a generally conically-shaped, hollow metallic element over said constricted portion.

3. A method as set forth in claim 2 wherein said tool is formed of iron or an iron alloy.

4. A method as set forth in claim 1 wherein said layer is applied to said constricted portion by painting said portion with a material selected from the group consisting of carbon emulsion and metallic paint.

5. A method as set forth in claim 4 wherein said material is silver paint.

6. A method as set forth in claim 1 wherein said tool is formed of carbon and inert gas is passed over said constricted portion while applying electromagnetic energy to said tool.

7. A method of sealing a wire in a glass tube having a constriction therein comprising the steps of:

applying a layer of electrically and thermally conductive material to said constriction;

positioning said wire through said constriction;

contacting said layer with an electrically and thermally conductive tool; and applying sufficient electromagnetic energy to said tool to seal said layer to said constriction and said constriction to said wire yet not destroy said layer.

References Cited

UNITED STATES PATENTS

| | | | |
|---|---|---|---|
| 2,359,500 | 10/1944 | White | 65—40 |
| 2,386,820 | 10/1945 | Spencer | 65—32 |
| 2,527,720 | 10/1950 | Guyer | 65—40 |
| 2,977,722 | 4/1961 | Mazzoni | 65—58 XR |
| 3,444,068 | 5/1969 | Leonard et al. | 204—195 |

S. LEON BASHORE, Primary Examiner

S. R. FRIEDMAN, Assistant Examiner

U.S. Cl. X.R.

65—43, 59, 60; 204—195